United States Patent
Snyder et al.

(10) Patent No.: US 10,358,809 B2
(45) Date of Patent: Jul. 23, 2019

(54) MACERATOR TOILET ASSEMBLY

(71) Applicant: Dometic Sweden AB, Solna (SE)

(72) Inventors: Nathan Snyder, Big Prairie, OH (US); Jeffry McVay, Mount Vernon, OH (US); Jacqulin Leedy, Millersburg, OH (US)

(73) Assignee: Dometic Sweden AB, Solna (SE)

( * ) Notice: Subject to any disclaimer, the term of this patent is extended or adjusted under 35 U.S.C. 154(b) by 0 days.

(21) Appl. No.: 15/533,284

(22) PCT Filed: Dec. 4, 2015

(86) PCT No.: PCT/IB2015/059382
§ 371 (c)(1),
(2) Date: Jun. 5, 2017

(87) PCT Pub. No.: WO2016/088105
PCT Pub. Date: Jun. 9, 2016

(65) Prior Publication Data
US 2017/0362808 A1 Dec. 21, 2017

Related U.S. Application Data

(60) Provisional application No. 62/088,080, filed on Dec. 5, 2014.

(51) Int. Cl.
*E03D 3/12* (2006.01)
*E03D 5/01* (2006.01)
(Continued)

(52) U.S. Cl.
CPC .............. *E03D 11/11* (2013.01); *B60R 15/04* (2013.01); *E03D 3/12* (2013.01); *E03D 5/01* (2013.01); *E03D 5/08* (2013.01); *E03D 5/10* (2013.01)

(58) Field of Classification Search
CPC .. E03D 11/11; E03D 3/12; E03D 5/01; E03D 5/08; E03D 5/10; B60R 15/04
(Continued)

(56) References Cited

U.S. PATENT DOCUMENTS 3,846,847 A 11/1974 Tufts et al.
3,878,569 A * 4/1975 Peirish, Jr. ................ E03D 9/10
4/319
(Continued)

FOREIGN PATENT DOCUMENTS

EP 1845209 10/2007
EP 1889979 2/2008
(Continued)

OTHER PUBLICATIONS

United States Design U.S. Appl. No. 29/584,310 entitled "Toilet" filed Nov. 14, 2016.
(Continued)

*Primary Examiner* — Tuan N Nguyen
(74) *Attorney, Agent, or Firm* — Middleton Reutlinger (57) ABSTRACT

A macerator toilet assembly (10) is provided with a multi-material toilet (10) having a base (14) formed of a first material, a bowl (16) formed of a second material, said multi material toilet (10) being connectable to one of a waste tank directly below or to a remote waste tank indirectly; a macerator pump (34) disposed on said toilet (10), downstream of a howl outlet end; and, a trap assembly (40) disposed downstream of the macerator pump (34).

24 Claims, 9 Drawing Sheets (51) Int. Cl.
*E03D 5/08* (2006.01)
*E03D 5/10* (2006.01)
*B60R 15/04* (2006.01)
*E03D 11/11* (2006.01)

(58) Field of Classification Search
USPC .......................................................... 4/319
See application file for complete search history.

(56) References Cited

U.S. PATENT DOCUMENTS

| | | | |
|---|---|---|---|
| 4,516,280 A | 5/1985 | Tufts | |
| 4,739,525 A | 4/1988 | De Graw et al. | |
| 6,212,700 B1 | 4/2001 | Giesler | |
| 6,883,188 B2 | 4/2005 | Sigler et al. | |
| 6,981,285 B2 | 1/2006 | Sigler et al. | |
| D531,711 S | 11/2006 | Bradford | |
| D532,492 S | 11/2006 | Giese | |
| D587,791 S | 3/2009 | Jaeckel et al. | |
| 7,725,961 B2 | 6/2010 | Martinez et al. | |
| 8,230,531 B2 * | 7/2012 | Miller | E03D 5/10 4/319 |
| 8,276,218 B2 | 10/2012 | Grech | |
| 8,656,524 B2 | 2/2014 | McKiernan | |
| D708,719 S | 7/2014 | Jochim et al. | |
| D708,720 S | 7/2014 | Jochim et al. | |
| D708,722 S | 7/2014 | Jochim et al. | |
| 2010/0115690 A1 * | 5/2010 | Wunderlich | B60R 15/04 4/321 |
| 2010/0125940 A1 | 5/2010 | Sigler et al. | |
| 2013/0130346 A1 * | 5/2013 | Hansen | B60R 15/04 435/167 |
| 2015/0059072 A1 | 3/2015 | Jochim et al. | |

FOREIGN PATENT DOCUMENTS

| | | |
|---|---|---|
| WO | 1800009 | 12/1978 |
| WO | 2016088105 | 6/2016 |

OTHER PUBLICATIONS

Canadian Design Patent Application No. [TBD] entitled "Toilet" filed May 8, 2017.
European Design Patent Application No. 00408704 entitled "Toilet" filed May 19, 2017.
European Patent Office: International Search Report and Written Opinion for PCT/IB2015/059382 dated Mar. 9, 2016.
Jabsco Products, Electric Toilets, Nov. 12, 2011.
Jabsco Products, 14" Deluxe Flush Electric Toilets; Model No. 58xx0 14" Series, Mar. 14, 2012.
Jabsco Products, 17" Deluxe Flush Electric Toilets; Model No. 58xx0 17" Series, Mar. 14, 2012.
Thetford Marine, Tecma Silence Plus Toilet, Oct. 6, 2014.
Thetford Marine, Tecma Easy Fit Toilet, Oct. 16, 2014.

* cited by examiner

MACERATOR TOILET ASSEMBLY

CLAIM TO PRIORITY

This Non-Provisional National Stage Application claims priority to and benefit under § 35 U.S.C. 365(b) to PCT Application No. PCT/IB2015/059382, filed on Dec. 4, 2015, titled "Macerator Toilet Assembly", which claims priority to and benefit under 35 U.S.C. § 119 to U.S. Provisional Patent Application 62/088,080, titled "Macerator Toilet Assembly", filed Dec. 5, 2014, all of which is incorporated by reference herein.

BACKGROUND

1. Field of the Invention

Present embodiments relate to toilets which may be utilized in recreational vehicles, boats, aircraft and other mobile or stationary type waste removal systems. More specifically, present embodiments relate to a macerator toilet assembly which allows for mounting over a waste tank or mounting remotely from a waste tank and which further reduces odor which is common with gravity-discharge toilets.

2. Description of the Related Art

Various types of toilets are known in the recreational vehicle (RV), mobile and stationary structure industry where toilets are utilized with an RV, plane, marine craft or other mobile structure and in some instances, stationary structures. In these configurations, waste from a toilet bowl is routed to either of two positions. In some constructions, a waste tank is located directly below the toilet and this type of system is generally referred to as a gravity-drop waste system. In a second type of system, the toilet may be mounted in one location and a waste tank located in a second location remote from the toilet. In such embodiment, it may be desirable to utilize a macerator to grind and reduce the waste material so that the waste is more flowable and suitable for pumping from the toilet to the remote waste tank.

However, one issue with known embodiments is that toilets may be utilized in floor plans for different manufacturers wherein some manufacturers may utilize a gravity-drop system and alternate manufacturers may utilize a remote located system. Accordingly, these manufacturers must order, and toilet manufacturers must be able to manufacture, separate lines of toilets for both layout types.

Additionally, some RV owners may renovate their RV so that a formerly gravity feed type system may be converted to a remote type system. In such circumstances, a new toilet must be purchased.

Still further, current manufacturers generally utilize a solid ceramic or china type bowl and base when designing a macerator toilet. However, the cost for using a complete china bowl and base assembly is considerably more expensive than the use of plastics for at least a portion of the toilet. Further, the weight of the china is higher and it would be desirable to reduce the weight of the toilet where possible for reasons of fuel efficiency in mobile application. Therefore, it would be desirable to reduce the cost and weight associated with the construction of a system which utilizes a macerator.

For these reasons, it may be desirable to provide a toilet which may be utilized in either of the gravity-discharge or remote type waste system for convenience purposes.

The information included in this Background section of the specification, including any references cited herein and any description or discussion thereof, is included for technical reference purposes only and is not to be regarded subject matter by which the scope of the invention is to be bound.

SUMMARY

Present embodiments are related to a macerator toilet assembly. The assembly may be utilized in either of a gravity-discharge or a remote waste tank type configuration. The toilet comprises a mixed or multi-material assembly wherein a first portion of the toilet is formed of china or ceramic and a second portion of the toilet is formed of plastic. A macerator may be disposed on the toilet and allows for grinding and pumping of waste materials either to the gravity-discharge location or outwardly from the toilet location to a second remote waste tank location. Further, the embodiment utilizes an integrally formed elbow in the base of the toilet with a seal adjacent to the elbow to allow for connection in a gravity-discharge configuration. A trap assembly is provided additionally so that water remains in the toilet and precludes the passage of odorous gases from the gravity-discharge waste tank upwardly through the toilet which is a concern of prior art gravity-discharge toilet systems.

According to some embodiments, a macerator toilet assembly comprises a multi-material toilet having a base formed of a first material, a bowl formed of a second material, the multi material toilet being connectable to one of a waste tank directly below or to a remote waste tank indirectly. A macerator pump may be disposed on the toilet, downstream of a bowl outlet end. A trap assembly may be disposed downstream of the macerator pump.

Optionally, the bowl may be a ceramic bowl. Still further, the base may be a plastic base. The macerator toilet assembly may further comprise a base elbow located in the base. The base elbow may be formed integrally in the base. The macerator toilet assembly may further comprise a funnel at the bowl outlet end of the bowl and in flow communication with an inlet of the macerator pump. The macerator toilet assembly may further comprise an elbow connected to the funnel. The elbow may have a plurality of ribs, for non-limiting example anti-rotation ribs. The ribs may be one of varying radial dimension or constant radial dimension. Further, the ribs may be one of constant or varying axial length. The macerator toilet assembly may further comprise a macerator pump outlet connected to the trap assembly. The trap assembly may further comprise an anti-siphon valve. The toilet assembly may further comprise a circuit board and may be located within the base. The circuit board may have at least one of a motor switch and a water switch. The toilet assembly may further comprise a foot pedal having a linkage to actuate the at least one of a motor switch and a water switch. The macerator toilet may further comprise an electronic water valve. The linkage may include a cam which actuates the at least one switch.

According to some embodiments, a macerator toilet assembly comprises a macerator toilet having a base of a first material and a bowl of a second material, a macerator pump having a motor, the bowl may have an outlet end which is connectable to one of a waste tank directly below or to a remote waste tank indirectly, a funnel and an elbow connected to the outlet of the bowl, the funnel and the elbow defining a trap which contains water and inhibits backflow of gas upwardly through the bowl, a trap assembly may be disposed downstream of the macerator pump, a circuit board may be in electrical communication with at least one switch for operating a water valve and the macerator motor.

Optionally, the macerator toilet assembly may further comprise the at least one switch being located in the toilet. The at least one switch may be at least one of first water switch and a second motor switch. An actuator and linkage may be movable to engage the at least one switch. The at least one switch may be located remotely from the toilet. The bowl may be formed of china and the base may be formed of plastic.

According to a further embodiment, a macerator toilet comprises a plastic base and a bowl formed of one of ceramic or china material, at least one of an elbow and a funnel located at a bowl outlet, and in flow communication with a macerator having a pump and a motor, a trap assembly extending from an outlet of the macerator pump, a base elbow in fluid communication with the trap assembly and capable of being connected to a waste tank in either of a gravity discharge configuration or a remote configuration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of macerator toilet assembly will now be described by way of examples. These embodiments are not to limit the scope of the claims as other embodiments of the macerating toilet assembly will become apparent to one having ordinary skill in the art upon reading the instant description. Non-limiting examples of the present embodiments are shown in figures wherein:

DETAILED DESCRIPTION

It is to be understood that the macerator toilet assembly is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numeral indicate like elements throughout several views, there are shown in FIGS. 1-9 various embodiments of a macerator toilet assembly. The macerator toilet assembly is configured to allow operation in either a gravity-discharge configuration or a remote waste tank configuration. The toilet assembly is provided with a multi-material design which provides for a more cost effective solution for various users while still allowing for macerator use. Further, the macerator toilet also inhibits backflow of gases which may allow malodorous gases into the interior lavatory and adjacent living spaces.

Figure 1:
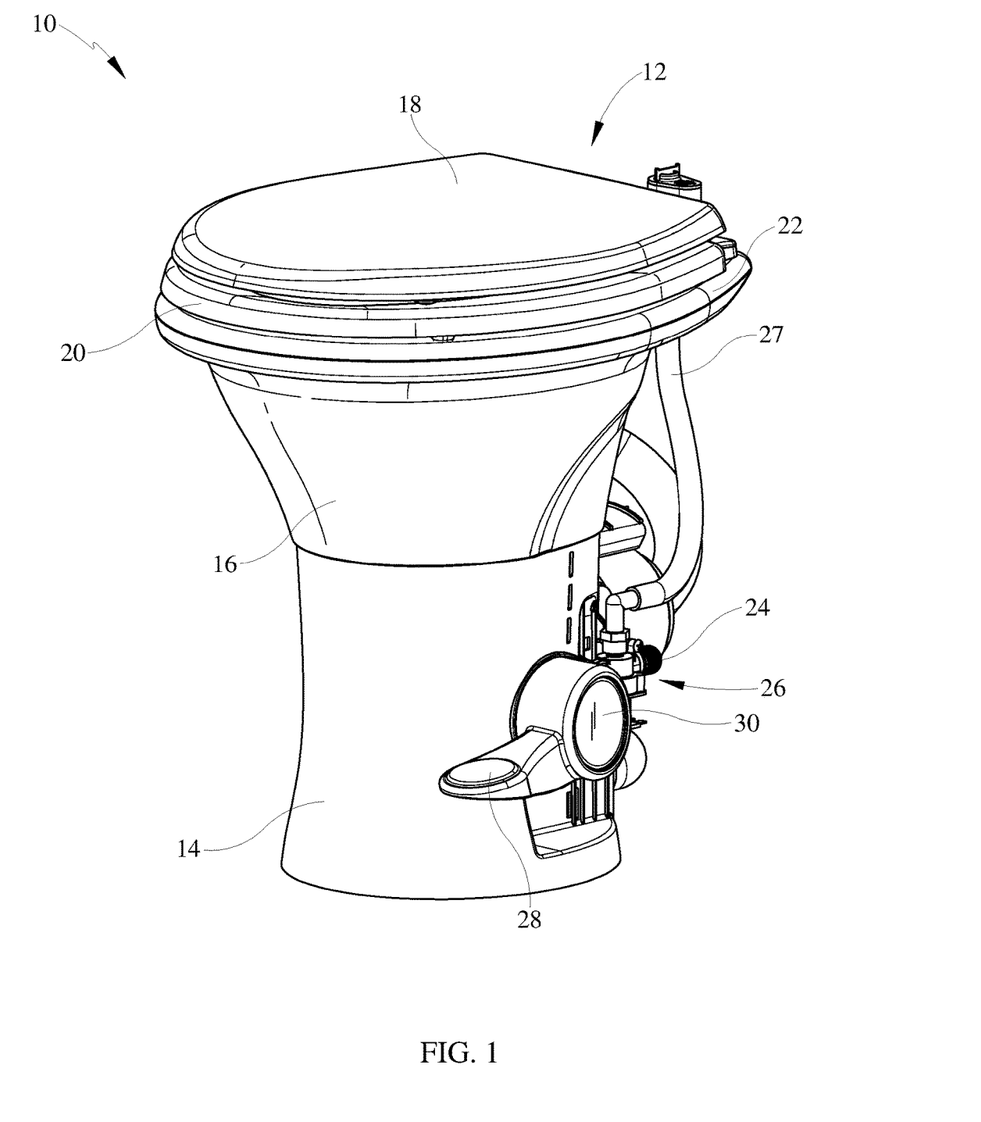
FIG. 1 is an isometric perspective view of an exemplary macerator toilet assembly.

Referring now to FIG. 1, an exemplary macerator toilet assembly 10 is shown. The macerator toilet assembly 10 includes a toilet 12 having a base 14 formed of a first material and a bowl 16 formed of a second material. The base 14, according to some embodiments, may be formed of a plastic material capable of supporting the weight of the bowl 16 and a user. The plastic base 14 may also be necessary to hide or cover certain mechanical or electrical structures defining the toilet assembly 10. Thus, while removed herein for purpose of discussion of the toilet mechanicals, a skirt may be utilized on the rear of the toilet assembly to enclose the pump, motor, tubing, valve(s) and the like. The base 14 also desirably allows for weight reduction within the toilet assembly 10 so that improvement of fuel efficiency of the RV can be attained. Further, the plastic base allows a similar look for the macerator toilets as the gravity toilets. Thus the toilet 12 may look like other toilets in a multiple lavatory RV, marine craft, aircraft, building or the like.

Additionally, the base 14 is generally of a smaller size than prior art base formed of china. Therefore, the plastic base may have a smaller footprint than is known with typical bases formed of china. However, by implementing the instant embodiments, various structures related to maceration must be included within the base that are normally not utilized in the gravity toilet base. The base 14 is formed with an interior cavity wherein a plurality of parts including macerator, motor, and control board are located. Additionally, in some embodiments, the skirt may be provided to extend about the rear exterior of the toilet 12 to enclose the trap assembly 40 described further herein.

According to some embodiments, the bowl 16 may be formed of a china or ceramic material. The use of china or ceramic material provides an upscale feel and appearance for the bowl, more similar to toilets used in residential and commercial constructions. The use of china or ceramic material in the bowl provides for a stain-free, durable and easily cleanable surface. Additionally, the plastic base 14 is of a lighter weight than the ceramic bowl 16 and therefore, provides weight savings for use in RV, marine craft, aircraft and buses where weight considerations must be taken into account during design of the product. The bowl 16 and the base 14 may be bolted together along an internal or external flange, or alternatively may be seated relative to the base 14 with a tongue/groove, seal or other sealing arrangement. Various alternative mounting configurations may be utilized. It is always desirable with mobile applications to reduce the weight of the product so as to improve fuel performance and/or fuel efficiency. While it is within the scope of the present embodiments that the bowl 16 and base 14 be formed of the same material, the use of mixed material construction provides various advantages including, but not limited to, the ability to produce the toilet assembly at a much lower cost and pass that onto the end user. Further, the use of mixed materials allows an RV manufacturer to provide a uniform look for the toilets in the event that one toilet is a gravity-discharge for example and a second toilet is a remote mount macerator configuration. Still further, the ornamental shape of the toilets may be consistently maintained across a line of toilets for a toilet manufacturer, which is desirable.

Figure 3:
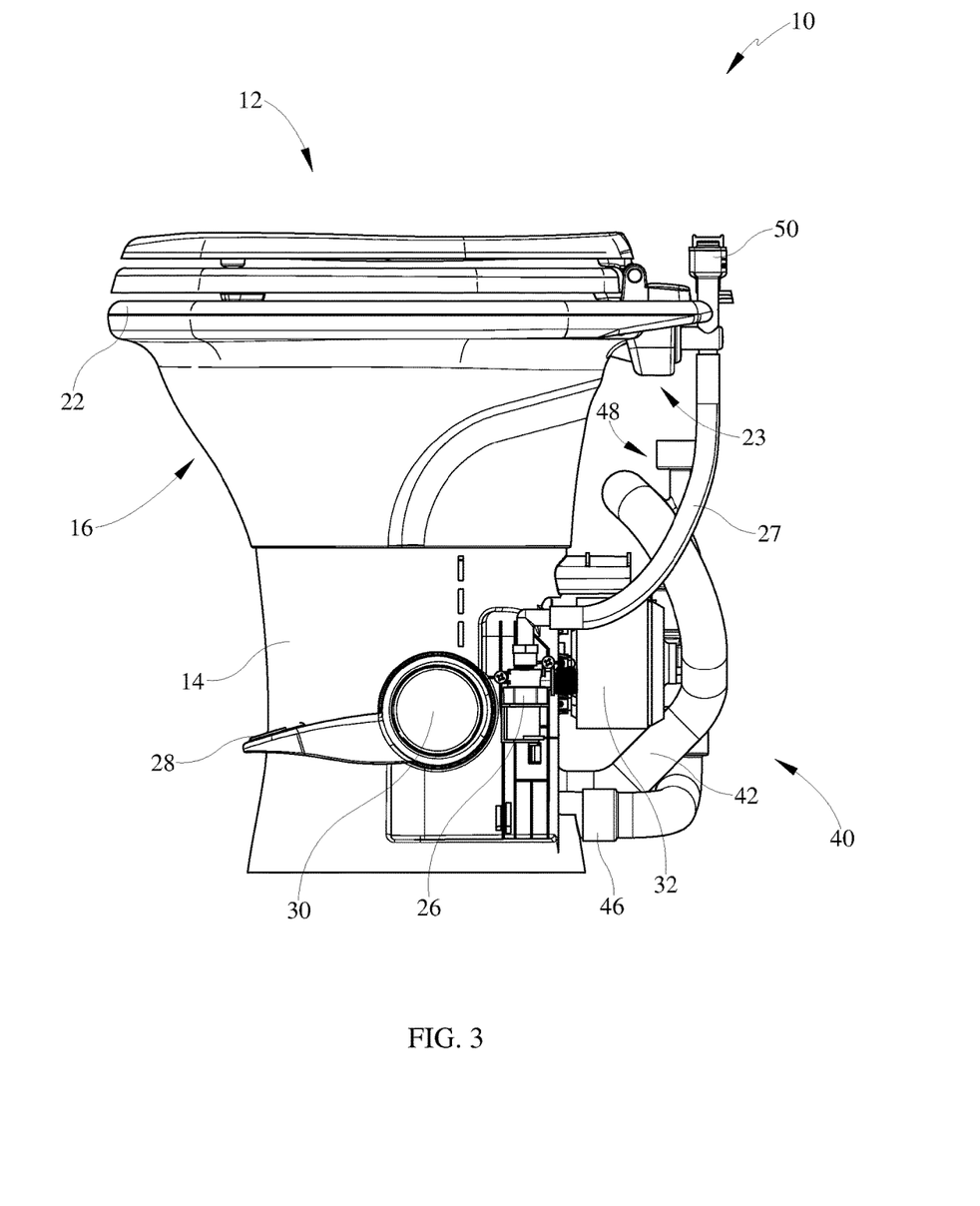
FIG. 3 is a first side elevation view of the exemplary macerator toilet assembly.

At the top of the ceramic bowl 16, is a cover 18 which is hingedly connected to a toilet seat 20 and to an upper rim 22 of the toilet 12. Further, a waterline inlet 24 is depicted further comprising a valve 26 and inlet waterline 27 which extends to the top of the toilet 12 for dispersion through the upper rim 22 or thereabouts to wash the bowl 16 through a bowl inlet 23 (FIG. 3). At the upper end of the toilet 12, adjacent to the upper rim 22 is the bowl inlet 23 (FIG. 3) which receives water from the inlet waterline 27 and valve 26. This provides clean water into the bowl 16 allowing cleaning of the bowl 16 and washing of the waste contained in the bowl 16 through the toilet 12.

At one side of the toilet assembly 10 adjacent to the valve 26 is a foot pedal 28 which is connected to a linkage 30 for actuating the flush function of the toilet assembly 10. The foot pedal 28 is shown in an up position and is depressed to actuate a flush sequence, according to some embodiments. The linkage 30 rotates with movement of the pedal 28 to cause actuation described further herein. The linkage 30 may include, but is not limited to, various types of structures and components. For example, in some embodiments, the linkage 30 may include a valve assembly which moves to open the bowl outlet 54. Such valve assembly may be a ball valve or moveable, rotatable or slidable valve structure to allow opening and closing action. As will be described further herein, the linkage 30 may include a pivot 76 (FIG. 7) and an actuator 71.

Figure 2:
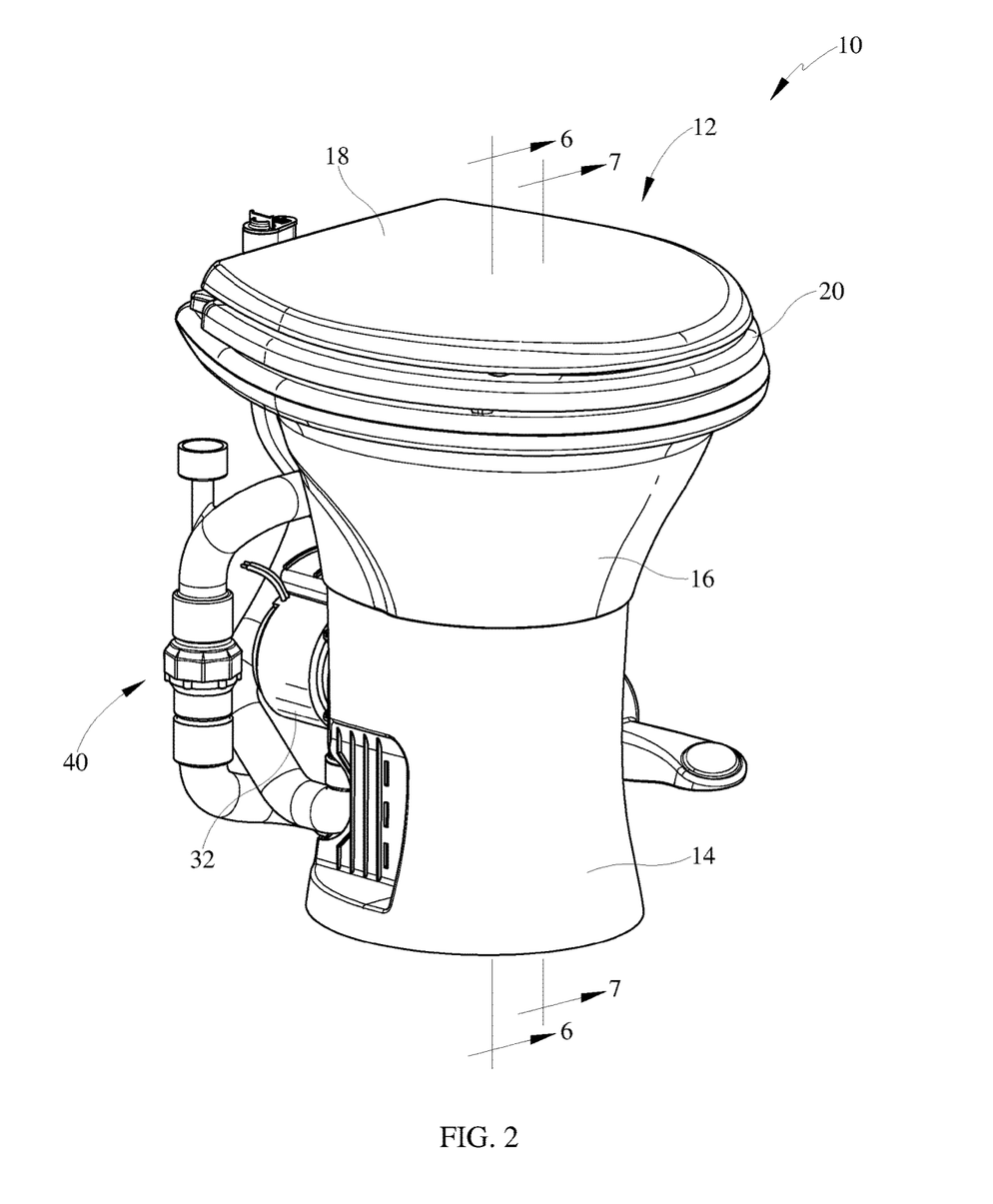
FIG. 2 is an alternate isometric view of an exemplary macerator toilet assembly.

Referring now to FIG. 2, an alternate isometric view of the toilet assembly 10 is provided. The toilet 12 is again shown with the cover 18, toilet seat 20, bowl 16 and the plastic base 14. A rear skirt is removed to depict various rear toilet mechanicals.

A trap assembly 40 is depicted in the instant view from the opposite side of the toilet 12. The trap assembly 40 receives macerated waste from a macerator pump 34 (FIG. 4) which is driven by a motor 32. The macerator pump 34 pumps the macerated waste through the trap assembly 40. Downstream of the trap assembly 40 is an inlet into the base 14 so that the waste is pumped to either the direct drop waste tank or a remote waste tank. The motor may be of various forms including AC or DC power, and of various voltages and further may be fixed speed or may be a variable speed motor.

Referring now to FIG. 3, a side view of the exemplary toilet assembly 10 is depicted. In this view, the foot pedal 28 is shown connected to the linkage 30 and the adjacent valve 26 is shown with the inlet waterline 27 is shown extending upwardly from the valve 26 toward the top of the toilet 12 near the upper rim 22.

At an upper end of the waterline 27 is a vacuum breaker 50. The vacuum breaker 50 prevents waste water from back flowing through the bowl and into the fresh water supply thus preventing contamination of the freshwater supply in the event of an overflowing bowl condition. Beneath the bowl inlet 23 and waterline 27 is the external trap assembly 40. When the toilet 12 is flushed, water passes through the bowl inlet 23, through the bowl 16 and downwardly through the base 14 into a macerator 60 (FIG. 6), which generally comprises pump 34 (FIG. 4) being rotated by the motor 32. The motor 32 and pump 34 (FIG. 4) grind or reduce the waste into a more flowable or pumpable form, such as a waste slurry or solution, so that the material may be pumped from the base 14 through the external trap assembly 40. The trap assembly 40 comprises a first pump outlet tube 42. The outlet tube 42 extends upwardly from the outlet of the macerator pump 34 and turns downwardly passing through a check valve 44 (FIG. 4).

Positioned above the check valve 44 (FIG. 4) is an anti-siphon valve 48. The anti-siphon valve 48 allows air into the external trap assembly 40 in the event that a vacuum condition occurs inside a base inlet tube 46 (FIG. 4). This could happen if, for example, two or more toilets are connected to a main discharge line and in flow communication with the base inlet tube discharge, and one toilet is flushed, or if waste water inside the piping sloshes and empties into a waste tank creating a vacuum in the other toilets. During a flushing process, the anti-siphon valve 48 closes to allow waste and fluid to moves through the trap assembly 40. After the flush process completes, the anti-siphon valve 48 opens to allow venting and inhibiting creation of vacuum which may cause siphoning of the bowl 16. Thus, the anti-siphon valve 48 is installed in order to maintain the water level in the bowl 16 and prevent it from being emptied during a siphon event. In the depicted arrangement for example, the anti-siphon valve 48 is normally open to prevent the vacuum from other toilets. However, when the toilet assembly 10 is flushed, the waste solution moving through trap assembly 40 causes the anti-siphon valve 48 to close temporarily as the waste solution passes. Subsequently, the valve 48 opens. After passing through the check valve 44, the waste solution moves through a base inlet tube 46 before moving back through the base 14.

Figure 4:
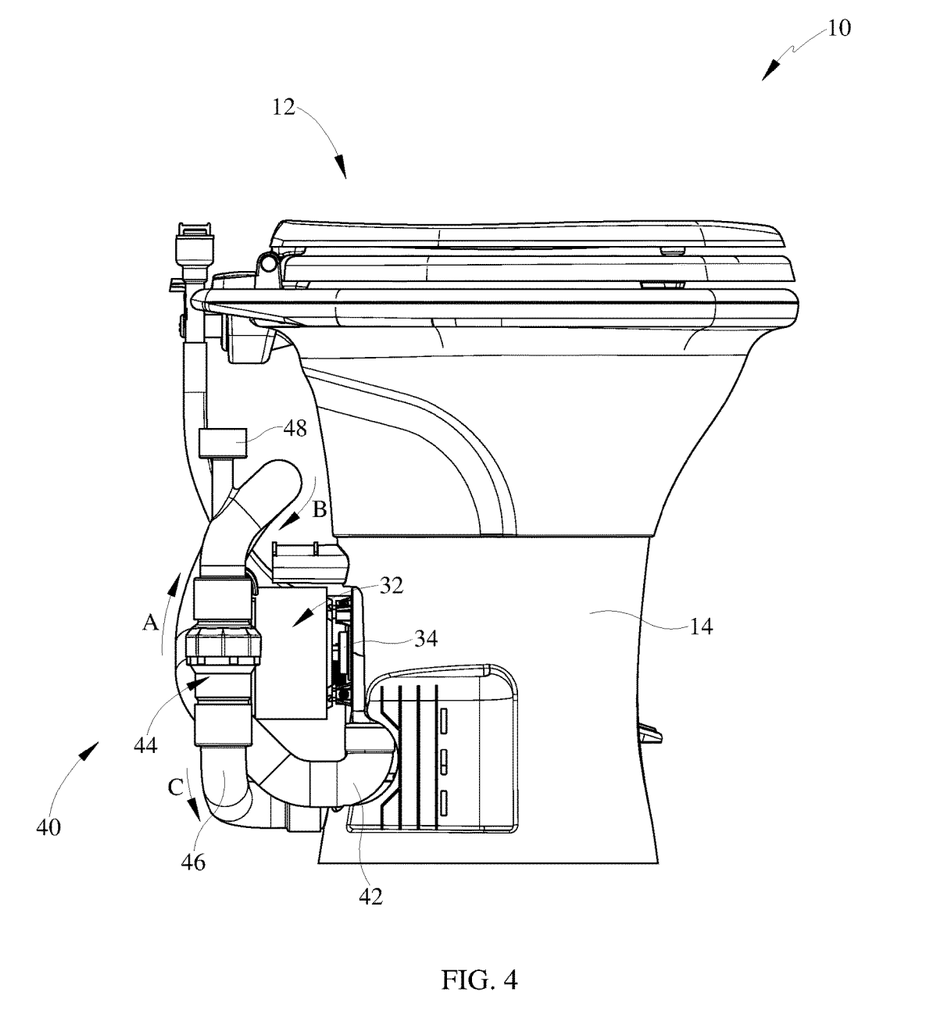
FIG. 4 is a second side elevation view of the exemplary macerator toilet.

Referring now to FIG. 4, an alternate side view to that shown in FIG. 3 is depicted. In this view, the trap assembly 40 is more easily described. The motor 32 is shown connected to a macerator pump 34. The pump 34 receives waste from the bowl 16 and grinds the waste material into a flowable and pumpable solution which moves from the pump 34 through the trap assembly 40 and back into the base 14 at the base inlet tube 46. The lower end of the pump 34 shows connection to the pump outlet tube 42 which extends upwardly and the flow of material is shown by arrow A moving upwardly in the depicted embodiment. Near the top of the pump outlet tube 42, the tube turns downwardly indicated at arrow B and moves toward the check valve 44. The waste solution passes the anti-siphon valve 48 which precludes flow in a reverse direction when pumping is complete. At the lower end of the check valve 44 of the base inlet tube 46 extends between the check valve 44 and the base 14. Flow of the waste solution continues in the C direction from the check valve 44 through the base inlet tube 46.

Figure 5:
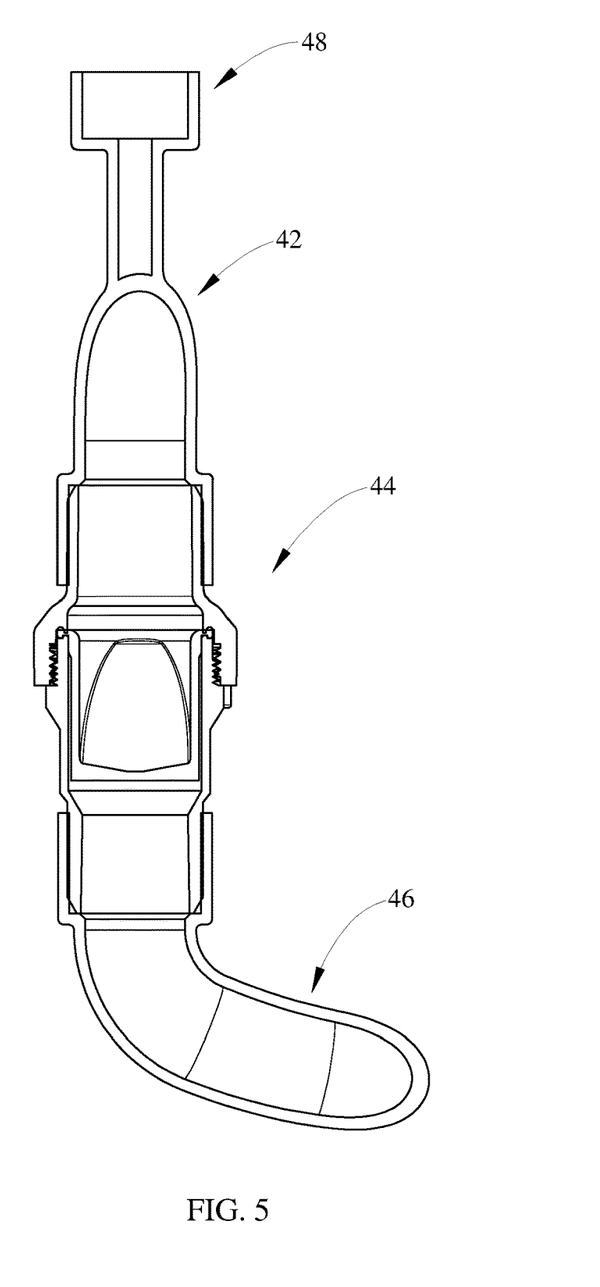
FIG. 5 is a section view of an exemplary check valve arrangement.

Referring now to FIG. 5, a section view of the check valve 44 and adjacent tubes 42, 46 are depicted. The check valve 44 precludes or inhibits flow from the base inlet tube 46 through the check valve 44 and to the pump outlet tube 42. Further, for example, in the event that multiple macerator toilets are plumbed to a single discharge line, the check valve 44 prevents backflow of waste from another toilet back into the macerator 60 or the bowl 16.

Additionally, the anti-siphon valve 48 is depicted near the top of the pump outlet tube 42. The tubes 42, 46 may be formed of plastic or rubber and the check valve 44 may be formed of metal or plastic material or some combination thereof. Additional materials may be utilized and therefore are not limiting to the depicted embodiments. Various forms and/or materials may be utilized. In the depicted embodiment, the check valve 44 may be threadably connected to one or both of the tubes 42, 46. Other connections may be utilized however, for example but not limited to hose clamp connection, friction fit, or permanently bonded. Additionally, the tubes 42, 46 may also be connected to one another in a variety of manners.

Figure 6:
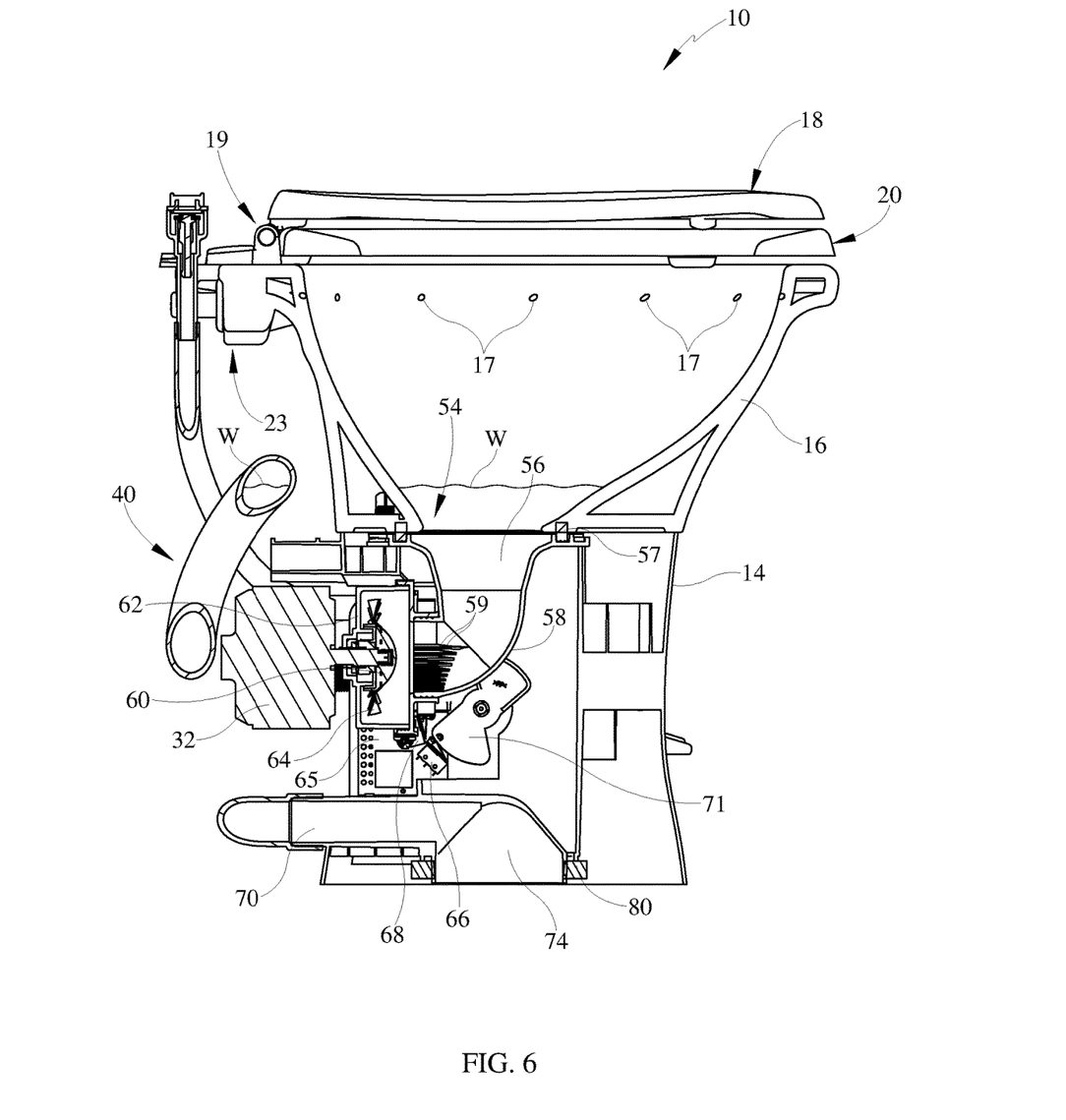
FIG. 6 is a side-section view of the exemplary macerator toilet assembly.

Referring now to FIG. 6, a side-section view of the toilet assembly 10 is shown. The section line for the instant view is depicted at FIG. 2. The section is taken through the cover 18, the seat 20, the bowl 16 and the base 14. A hinge 19 is located at one side of the cover 18 and seat 20 to connect the bowl 16 with the cover 18 and the seat 20.

In this view, the bowl 16 and base 14 are revealed. At an upper end of the bowl 16 are a plurality of inlet apertures 17. The bowl inlet 23 is in flow communication with apertures 17 to allow water flow into the bowl 16. At a lower end of the bowl 16, is a bowl outlet 54. The outlet 54 functions as an exit for the materials passing through the bowl 16. At a lower end of the bowl outlet 54 is a funnel 56. The funnel 56 gathers all of the waste contents exiting the bowl 16 and provides a conduit for movement of the waste contents leaving the bowl 16 to move to a macerator 60. The funnel 56 also functions to transition from a larger opening size at the bowl outlet 54 to a smaller opening size of the macerator 60. Connected to the funnel 56 is an elbow 58 which connects to an inlet of the macerator 60. The elbow 58 turns the flow direction of the waste material from a vertical travel direction to a horizontal travel direction. The elbow 58 may be formed integrally with the funnel 56 or may be formed independently and joined together during assembly of the toilet 10. Further, the funnel 56 and elbow 58 may be integrally formed in the base 14 or may be formed independently and seated in or connected to the base 14. In such arrangement, the funnel 56 and elbow 58 may be sealed relative to the bowl 16 by one or more seals 57. At the lower end of the elbow 58 are a plurality of ribs 59. During a flush, it was found that toilet paper had a tendency to reach the lower end of the elbow 58 and spin along the wall of the elbow 58 rather than enter the macerator 60. The ribs 59 function as an anti-rotation ribs and preclude such rotation of toilet paper and other solid materials. Also, the ribs 59 maintain the suction created by the macerator 60 and pull the toilet paper or other particles into the macerator 60. The ribs 59 may have a fixed or constant radial dimension (thickness) from the inner surface of the elbow 58, or alternatively, the ribs 59 vary in radial dimension, for example tapering radially, as shown. Further, the ribs 59 may all be of constant axial length or may vary in length as shown. Waste materials can exit the bowl 16, pass through the funnel 56 and the elbow 58 to the macerator 60. The funnel 56 and elbow 58 also fill with water when flushing is complete to provide a water trap in addition to the external trap assembly 40 and inhibits passage of odorous gases from downstream in the toilet up through the bowl 16. This is desirable as one problem with gravity drop systems is the backflow of malodorous gases from the waste tank below into the interior quarters through the toilet when a gravity-discharge toilet is flushed.

The macerator 60 includes a pump 34 having a pump housing 62 wherein a pump impeller 64 is located. When the toilet assembly 10 is flushed, the impeller 64 is rotated by the macerator motor 32. The pump 34 of the macerator assembly 60 starts at a very high speed creating a negative pressure between the macerator assembly 60 and the toilet bowl 16. This creates siphonic action to remove the waste and fresh water from the bowl 16, the elbow 58 and funnel 56. In the base 16 the waste material, solid and/or liquid, is broken down and mixed with fresh water that passes through the bowl 16 from the bowl inlet 23 (FIG. 3). The waste material is formed into a flowable or pumpable waste solution or slurry which is pumped through a macerator outlet through the external trap assembly 40 (FIG. 2).

The external trap assembly 40 is connected to and extends between the macerator 60 and the base 14. The trap assembly 40 moves waste material out from the macerator 60 and back into the base 14. At a lower end of the base 14 is an elbow inlet 70. The elbow inlet 70 may be in the form of a tube or pipe extending from the rear of the base 14 to a base elbow 74. At the base elbow 74, the waste solution turns downwardly and is pumped into a waste tank either directly below the toilet 12 or to a waste tank which is remotely located.

Beneath the base elbow 74, or surrounding such, a flange seal 80 may be provided. This is desirable for use in a gravity-discharge toilet configuration while also allowing for the remotely located waste tank configuration.

Also shown in the section view of an exemplary present embodiment is an electromechanical actuation system for causing the flushing action. When the toilet 12 is flushed, two actions may occur. First, the water through inlet 27 is actuated to move into the bowl 16 to fill the funnel 56. This allows the water to be pumped by the macerator 60. Second, the macerator 60 must be actuated to reduce and/or mix the water and waste into a pumpable solution. In order to actuate the system, the linkage 30 (FIG. 1) comprises a mechanical actuator 71. In some embodiments, the actuator 71 includes a cam. When the foot pedal 28 (FIG. 1) causes rotation of the linkage 30, the actuator 71 is caused to rotate and actuate at least one switch. In the present embodiment, the at least one switch may comprise a water valve switch 66 and a motor switch 68. The switches are positioned on a circuit board 65, which is located within the toilet 12, for example within the base 14.

Also shown in the side-section view, the interior of the bowl 16 is shown with a water level line W. The water level line W is also shown in the trap assembly 40. When the flush function is complete, the valve 26 is left open for some period of time to allow some water in the bowl and within the funnel 56 and elbow 58. Some water may be left in the macerator 60 and the trap assembly 40 as depicted. The water level in the trap 40 will equalize in the bowl 14. The fresh water that remains within the toilet assembly 10 inhibits backflow of malodorous gas from the waste tank or plumbing connected to the waste tank upwardly through the toilet 12 and into interior quarters where the toilet is located, for example within a lavatory.

Figure 7:
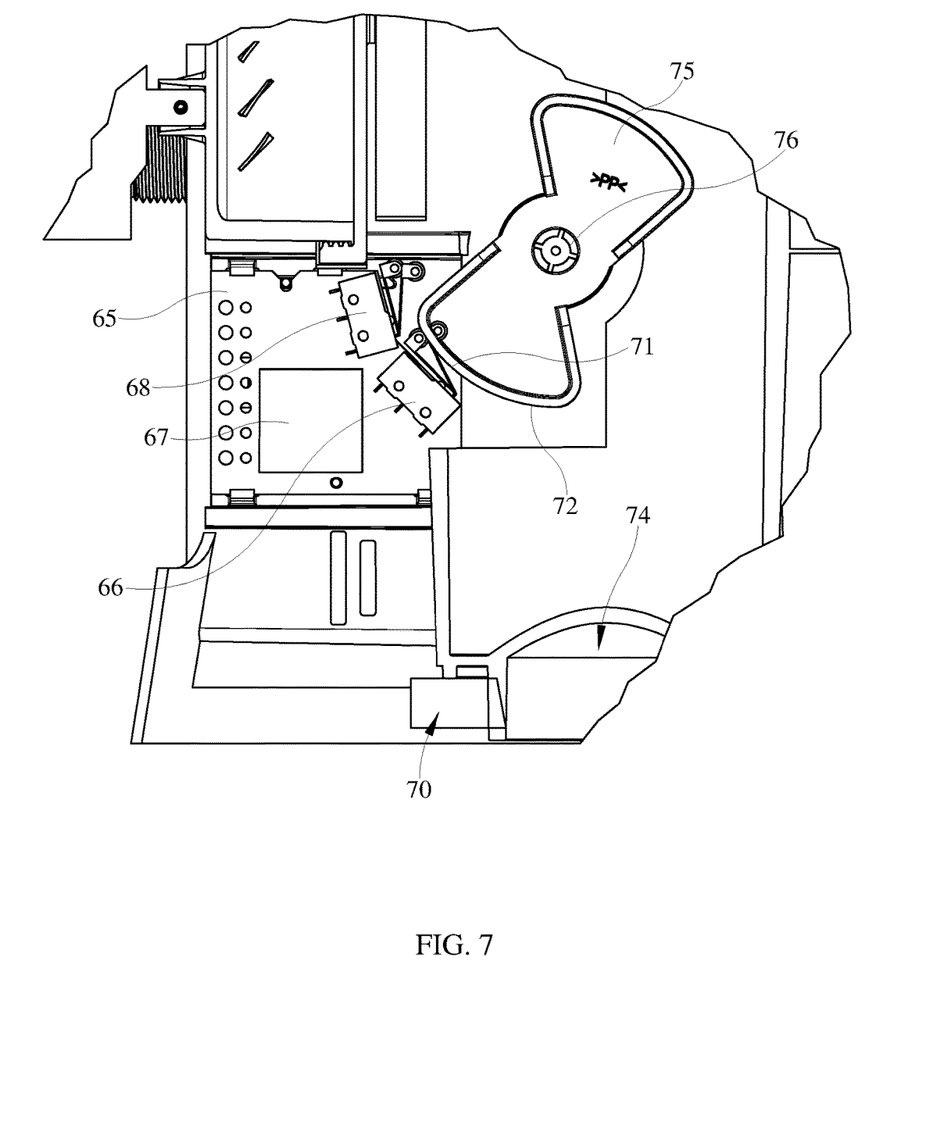
FIG. 7 is a detailed view of a circuit board with electromechanical actuation for a water valve and the macerator pump.

Referring now to FIG. 7, a detail view of a portion of the actuation system is depicted. The circuit board 65 is shown adjacent to the mechanical actuator 71. The mechanical actuator 71 of the instant embodiment comprises a first lobe 72 and a second lobe 75 which have engagement lobe surfaces spaced from an actuator pivot 76. As may be gleaned from the depicted view, when the actuator 71 rotates, either of the first lobe 72 and the second lobe 75 may engage switches 66, 68. The lobes 72, 75 may have various sizing and spacing dependent upon the location of the adjacent switches 66, 68 and their spaced relationship to one another. Further, it should be understood that actuating motion should not be limited to rotation or pivot but may also include other motions to create actuation of the one or more switches.

According to the depicted embodiment, the actuator assembly includes the water switch 66 and the motor switch 68. The switches 66, 68 are positioned along the path of travel of the lobes 72, 75 so that when the actuator 71 rotates, the switches 66, 68 are engaged synchronously by the lobes 72, 75. The actuation of the first switch 66 causes opening of the water valve 26 (FIG. 1) allowing supply water to move through the valve 26 and to the bowl inlet 23 (FIG. 6). This rinses the bowl 16 with fresh water, which may also be used to create a more pumpable waste solution in combination with solid waste, such as fecal material and/or toilet paper.

Still further, the circuit board 65 further comprises the motor switch 68. When actuated, this switch 68 causes movement of the macerator motor 32 (FIG. 6) which causes rotation of the impeller 64 (FIG. 6). The impeller 64 is driven by the motor 32 which is electrically connected to the motor switch 68. As the actuator 71 engages the motor switch 68, the motor 32 rotates causing pumping of waste solution from the macerator 60, through the elbow inlet 70 and into the base elbow 74.

In alternate embodiments, it is contemplated that rather than two switches, a single switch may be utilized. For example, the switch may actuate both the water valve 26 and the pump motor 32. The actuation of the valve and motor 26, 32 may be timed and sequenced to provide rinse, flush and re-fill of fresh water. Or in some embodiments, the foot pedal 28 may be depressed, causing the bowl to receive some amount of water. Subsequently, the sequence of flush and fill may occur when the foot pedal 28 is depressed further to a second position. It should be understood therefore that the pedal 28 may be moved once to actuate one switch or actuated into two or more positions to actuate two or more switches.

In still further embodiments, an alternate arrangement is contemplated wherein the foot pedal 28 may provide a slow closing action, so that the water switch 66 remains open for some period of time, rather than closing quickly. This would allow the water switch 66 to remain open for some period of time while the valve closes.

Figure 8:
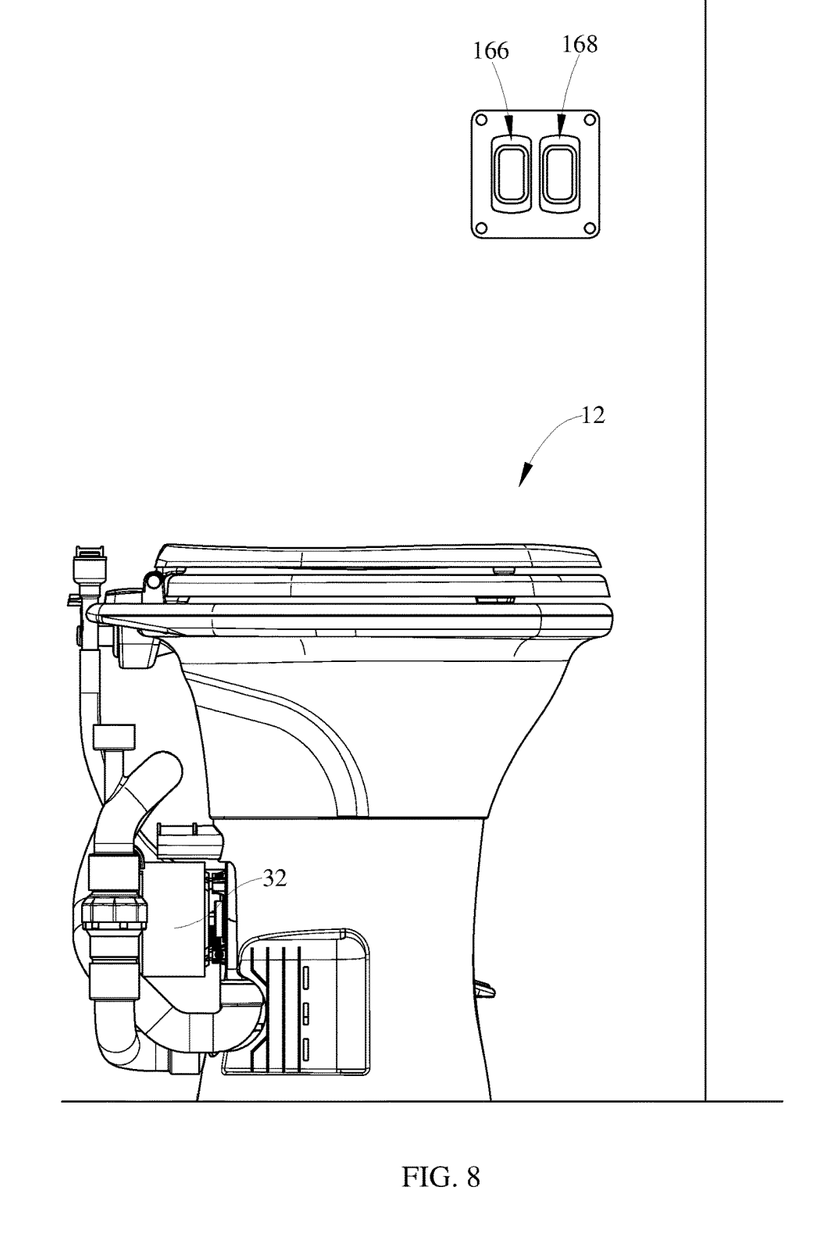
FIG. 8 is an alternative embodiment for actuating the toilet depicting remote switches is provided; and, FIG. 9 is a schematic view of exemplary gravity drop and remote waste tank configurations.

In alternate embodiments, the switches 66, 68 may be located at remote locations. Referring now to FIG. 8, an alternate embodiment is depicted for actuating the toilet 12. At a remote location, instead of being operated at a foot pedal, for example, the switches 166, 168 may be located on a wall of the lavatory. Thus after using the lavatory, the user can actuate the water valve 26 (FIG. 3) and/or the macerator motor 32 with remote mounted switches 166, 168 rather than the foot pedal. Further, it should be understood that the foot pedal actuation may be used in addition to the remote switches 166, 168.

Figure 9:
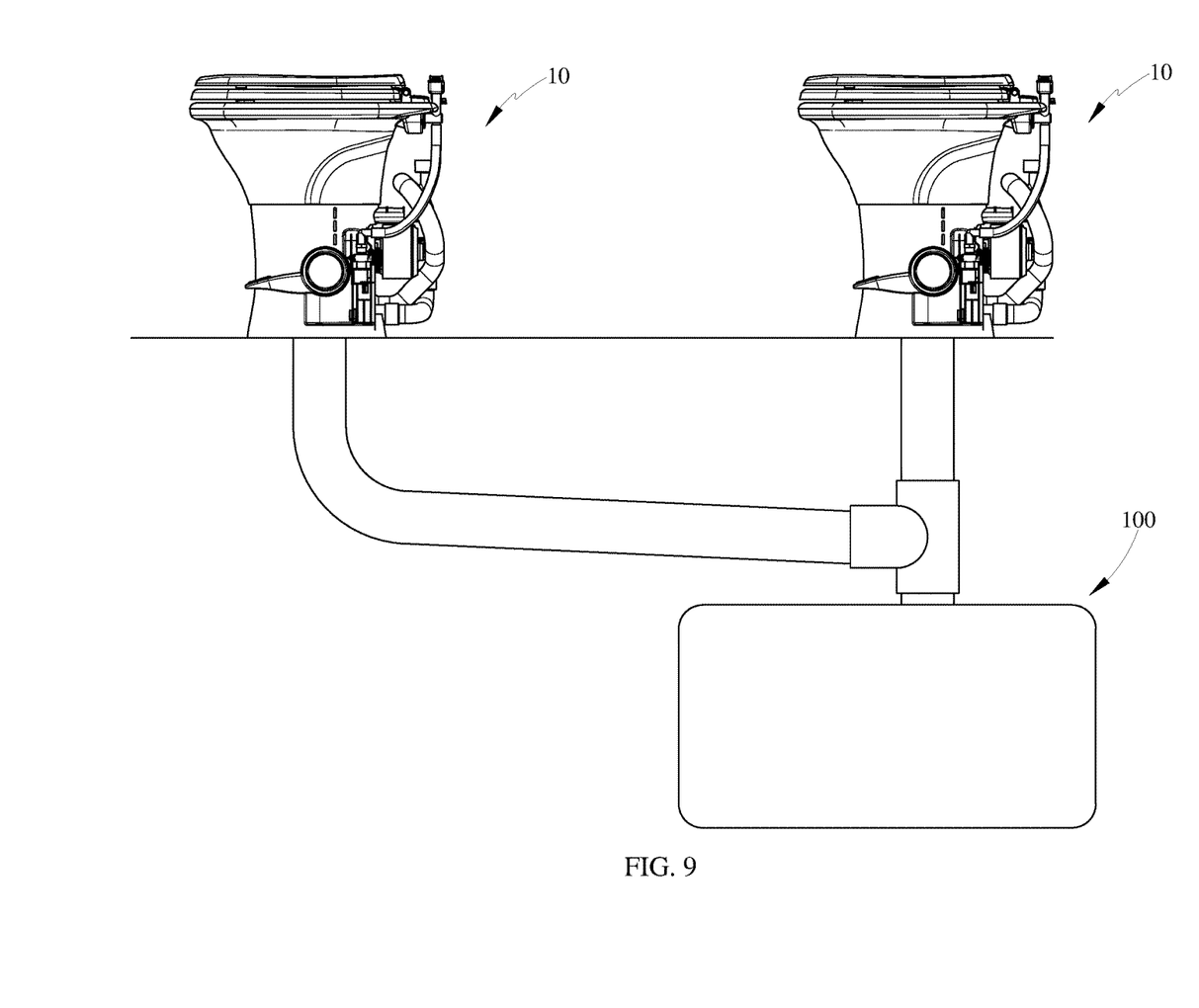

Referring now to FIG. 9, a schematic view of an exemplary plumbing arrangement is depicted. While the embodiment shows two toilets connected to one waste tank 100, it should be understood that either arrangement may be used independently. In one embodiment, the toilet assembly 10 is positioned over the tank to define the gravity discharge configuration. In the alternate configuration, the toilet assembly 10 is mounted at a location remote from the waste tank 100, in the remote configuration. In such remote configuration, waste from the toilet assembly 10 is transported by pump to flush water as previously described. In some alternatives, a vacuum system may be used to move waste additionally or alternatively to a pump system. In either the gravity discharge configuration or the remote mount configuration, the tank 100 is connected by plumbing generally referred to as discharge pipe to connect the toilet assemblies 10 to the tank 100.

With regard to the waste tank 100, a deodorizing chemical may be added to the holding tank to reduce the odors that are emitted from the tank. However, these chemicals can contain strong biocides and sometimes emit an unpleasant odor from the chemical itself. When deodorizers are added to the holding tank 100, the deodorizers run off the mound of solids and into the retained liquid. Thus, any waste above the liquid level within the tank 100 may be extremely malodorous. In addition, the presence of the mound of solid waste can restrict the odors from reaching the exit vent.

Although not shown in this schematic, the waste tank 100 may also comprise a vent line which extends from the waste tank 100 to the exterior of the vehicle, marine or air craft.

In this depicted arrangement, it is clear that without suitable means of limiting backflow of malodorous gases, the noxious smells of a waste tank 100 would pass through prior art toilets and into the lavatory or living space of the vehicle or structure wherein the toilet would be utilized. However, the present toilet 10 allows for use of the toilet 10 in either of a gravity-discharge or remote mount configuration while also limiting smells that may emanate from the tank 100 and through the toilets 10, especially in a gravity discharge configuration when the toilet bowl outlet 54 (FIG. 6) is open.

In operation, and with reference to all the preceding Figures, the user uses the lavatory toilet 12 and prepares to flush. First, the pedal 28 is depressed partially so that the linkage 30 and the mechanical actuator 71 move and engage the water switch 66. When the water switch 66 is engaged, the valve 26 opens allowing water to move through the valve 26, upwardly through the inlet tube 27 to the bowl inlet 23. The valve 26 may stay open as long as the pedal 28 is depressed and up to some preselected time, for example up to 15 seconds. The upper limit may preclude over usage of water and potential overflow of water into the bowl 16. The water passes through the valve 26, inlet tube 27, through the vacuum breaker 50 and through the bowl inlet 23.

Next, the pedal 28 may be depressed further to cause further movement of the mechanical actuator 71. This causes engagement with the motor switch 68. In this second position, the water switch 66 and the motor switch 68 may both be engaged. At this time, a microprocessor 67 may begin a flush sequence at which time the pedal may be released. The sequence causes the valve 26 to open for some preselected time, for example about 10 seconds. This allows the bowl 16 to fill so that the macerator 60 may effectively clear the bowl contents. Then the motor 32 may run for a second preselected time. For example, the time may be up to 15 seconds and in some embodiments may be about 6 seconds. When the motor switch 68 is actuated, the motor 32 begins to rotate causing rotation of the impeller 64 of the macerator 60. The preselected time should allow for substantial clearing of the bowl contents. After the motor 32 stops running, the electric water valve 26 may be allowed to run for some additional period of time. This refills the funnel 56, which also serves to prevent backflow of gases through the toilet 12 and bowl 16 into the lavatory.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A macerator toilet assembly, comprising:
a multi-material toilet having a base formed of a first material of said multi-material, a bowl formed of a second material different than said first material, said bowl having an inner surface and a plurality of apertures in said inner surface to allow water flow into said bowl, said bowl and said base being coupled together, and said base being entirely below and supporting said bowl, said multi-material toilet being connectable to at least one of a waste tank below or to a remote waste tank indirectly;
a macerator pump disposed on said toilet, downstream of a bowl outlet end; and,
a trap assembly disposed downstream of said macerator pump.

2. The macerator toilet assembly of claim 1, wherein said toilet comprises a ceramic bowl.

3. The macerator toilet assembly of claim 2, wherein said toilet comprises a plastic base.

4. The macerator toilet assembly of claim 3 further comprising a base elbow located in said base.

5. The macerator toilet assembly of claim 4, wherein said base elbow is formed integrally in said base.

6. The macerator toilet assembly of claim 1 further comprising a funnel at said bowl outlet end of said bowl and in flow communication with an inlet of said macerator pump.

7. The macerator toilet assembly of claim 6 further comprising an elbow connected to said funnel.

8. The macerator toilet assembly of claim 6, said elbow having a plurality of ribs.

9. The macerator toilet assembly of claim 8, said ribs being one of varying radial dimension or constant radial dimension.

10. The macerator toilet assembly of claim 9, said ribs being one of constant or varying axial length.

11. The macerator toilet assembly of claim 6 further comprising a macerator pump outlet connected to said trap assembly.

12. The macerator toilet assembly of claim 11 further comprising an anti-siphon valve in said trap assembly.

13. The macerator toilet assembly of claim 1 further comprising a circuit board.

14. The macerator toilet assembly of claim 13, said circuit board having at least one of a motor switch and a water switch.

15. The macerator toilet assembly of claim 14 further comprising a foot pedal having a linkage to actuate said at least one of a motor switch and a water switch.

16. The macerator toilet assembly of claim 14 further comprising an electronic water valve.

17. The macerator toilet assembly of claim 15, said linkage including a mechanical actuator.

18. A macerator toilet assembly, comprising:
a macerator toilet having a base of a first material and a bowl of a second material different than said first material, said bowl having an inner surface with a plurality of apertures to allow water flow into said bowl, said base and said bowl being coupled together wherein said base is disposed entirely below said bowl and supporting said bowl;
a macerator pump having a motor, said macerator in flow communication with said bowl;
said toilet being connectable to either of a waste tank below or to a remote waste tank indirectly;
a funnel and an elbow connected to an outlet of said bowl, said funnel and said elbow defining a trap which contains water and inhibits backflow of gas upwardly through said bowl;
a trap assembly disposed in downstream of said macerator pump;
a circuit board in electrical communication with at least one switch for operating a water valve and the macerator motor.

19. The macerator toilet assembly of claim 18 further comprising said at least one switch being located in said toilet.

20. The macerator toilet assembly of claim 19 wherein said at least one switch is a first water switch and a second motor switch.

21. The macerator toilet assembly of claim 19 further comprising an actuator and linkage movable to engage said at least one switch.

22. The macerator toilet assembly of claim 18 wherein said at least one switch is located remotely from said toilet.

23. The macerator toilet assembly of claim 18 wherein said bowl is formed of ceramic and said base is formed of plastic.

24. A macerator toilet assembly, comprising:
a plastic base and a bowl formed of ceramic material, said base and said bowl being coupled together;
said bowl having an inner surface with a plurality of apertures to allow water flow into said bowl;
at least one of an elbow and a funnel located at a bowl outlet, and in flow communication with a macerator having a pump and a motor;
a trap assembly extending from an outlet of said macerator pump;
a base elbow in fluid communication with said trap assembly and capable of being connected in either of a first configuration with a gravity discharge waste tank or a second configuration with a remote waste tank configuration.

* * * * *